United States Patent
Song (10) Patent No.: US 9,346,437 B2
(45) Date of Patent: May 24, 2016

(54) WIPER BLADE ASSEMBLY

(75) Inventor: Kyoung Joon Song, Daegu (KR)

(73) Assignee: CAP CORPORATION (KR)

(*) Notice: Subject to any disclaimer, the term of this patent is extended or adjusted under 35 U.S.C. 154(b) by 145 days.

(21) Appl. No.: 14/234,046

(22) PCT Filed: Jul. 19, 2012

(86) PCT No.: PCT/KR2012/005780
§ 371 (c)(1),
(2), (4) Date: Jan. 21, 2014

(87) PCT Pub. No.: WO2013/015564
PCT Pub. Date: Jan. 31, 2013

(65) Prior Publication Data
US 2014/0366302 A1   Dec. 18, 2014

(30) Foreign Application Priority Data

Jul. 26, 2011   (KR) .................. 10-2011-0074217

(51) Int. Cl.
*B60S 1/40* (2006.01)
*B60S 1/38* (2006.01)

(52) U.S. Cl.
CPC .............. *B60S 1/4016* (2013.01); *B60S 1/3867* (2013.01); *B60S 1/4009* (2013.01); *B60S 1/4067* (2013.01); *B60S 1/4083* (2013.01); *B60S 2001/409* (2013.01); *B60S 2001/4022* (2013.01)

(58) Field of Classification Search
CPC .... B60S 1/4003; B60S 1/4038; B60S 1/4067; B60S 1/4083; B60S 1/4006; B60S 1/3867; B60S 1/4009
USPC .............. 15/250.32, 250.43, 250.361, 250.44
See application file for complete search history.

(56) References Cited

U.S. PATENT DOCUMENTS

| 5,084,933 | A  | * | 2/1992  | Buechele  | B60S 1/4003 15/250.32 |
| 5,632,059 | A  | * | 5/1997  | Lee       | B60S 1/4003 15/250.32 |
| 5,937,474 | A  | * | 8/1999  | Hussaini  | B60S 1/4003 15/250.32 |
| 6,481,044 | B1 | * | 11/2002 | Journee   | B60S 1/4038 15/250.32 |
| 6,539,576 | B2 | * | 4/2003  | Kim       | B60S 1/40 15/250.32 |
| 6,640,380 | B2 | * | 11/2003 | Rosenstein| B60S 1/4003 15/250.32 |
| 7,584,520 | B2 | * | 9/2009  | Hussaini  | B60S 1/4003 15/250.32 |

(Continued)

FOREIGN PATENT DOCUMENTS

| JP | 20-1990-0003565 | 4/1990 |
| JP | 2005-075050     | 3/2005 |

(Continued)

OTHER PUBLICATIONS

International Search Report issued on Jan. 31, 2013 in International Application No. PCT/KR2012/005780.

*Primary Examiner* — Michael Jennings
(74) *Attorney, Agent, or Firm* — Onello & Mello, LLP (57) ABSTRACT

A wiper blade assembly configured to facilitate coupling of a wiper arm and a connector member is provided to remove a space in which a U-shaped wiper arm moves forward or backward to couple with a connector member. The wiper blade assembly includes a wiper connector part. The wiper connector part comprises a connector member (130) and a connector receiving part (140). A wiper arm (150) is coupled to the connector member. The connector member is received in the connector receiving part. The connector receiving part comprises a first hinge shaft and a second hinge shaft.

5 Claims, 7 Drawing Sheets

(56) References Cited

U.S. PATENT DOCUMENTS 7,774,892 B2 *  8/2010  Coughlin .............. B60S 1/4038
                                                    15/250.32

FOREIGN PATENT DOCUMENTS

| KR | 20-1990-0003567 | 4/1990 |
| KR | 10-1996-0033946 | 10/1996 |

* cited by examiner

WIPER BLADE ASSEMBLY

TECHNICAL FIELD

The present invention relates to a wiper blade assembly, and more particularly, to a wiper blade assembly configured to facilitate coupling of a wiper arm and a connector member.

BACKGROUND ART

A wiper blade assembly for wiping out the rain in case of rain or removing foreign materials to secure a driver's visual field is disposed in a wind shield of a vehicle. The wiper blade assembly is connected to a wiper arm connected to a driving shaft connected to a wiper driving motor of the vehicle to be driven.

Here, the wiper arm and the wiper blade assembly are connected to each other through a wiper connector part. In general, the wiper blade assembly includes a clamp, to which the connector member is coupled, and the wiper arm is coupled to the connector member in a state in which the connector member is coupled to the clamp.

Meanwhile, the wiper blade assembly may be classified into a conventional type and a flat type according to the structure of a blade.

The conventional type wiper blade assembly is configured to apply an elastic force to pressing a vehicular wind shield against a rubber strip making contact with the wind shield by coupling a plurality of yokes curved in an arc shape with an up-down structure and is widely used in the conventional wiper blade assembly of a vehicle.

Meanwhile, the flat type wiper blade assembly includes a single elastic member or a pair of elastic members, instead of yokes. The flat type wiper blade assembly has a simplified structure and is gradually increasingly distributed owing to its pleasing appearance when it is mounted on the vehicle.

Figure 1:
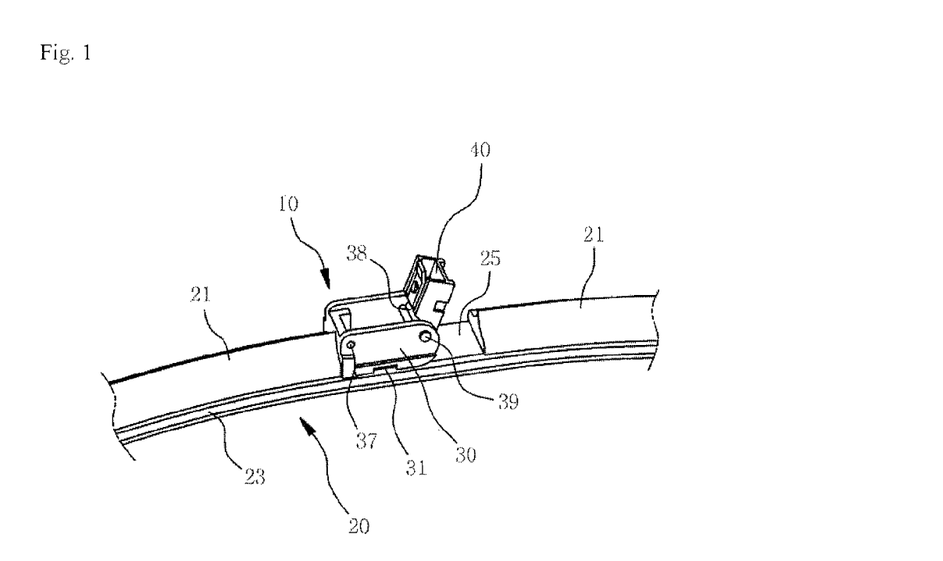
FIG. 1 is a perspective view illustrating a portion of a conventional wiper blade assembly.

FIG. 1 is a perspective view illustrating a portion of a conventional wiper blade assembly, specifically a flat type wiper blade assembly.

The wiper blade assembly 20 shown in FIG. 1 is a flat blade connected to a wiper arm without a primary yoke and a secondary yoke. However, the present invention that follows is not limited to the flat type wiper blade.

A blade rubber 23 making contact with the vehicular wind shield and a pair of spoilers 21 are provided in the wiper blade assembly 20 shown in FIG. 1, and a wiper connector part 10 is disposed around the lengthwise center of the wiper blade assembly 20. The wiper connector part 10 includes a connector member 40 to which a wiper arm (not shown) is coupled, and a clamp 30 coupled to the connector member 40 and having the connector member 40 received therein.

As shown in FIG. 1, the clamp 30 is preferably fabricated separately from the wiper blade assembly 20. However, it will be appreciated that each of the clamp 30 and the connector member 40 is formed of a single member according to embodiment.

As described above, the conventional wiper blade assembly is configured such that the clamp is provided to be coupled to a connector member and the clamp and the wiper arm is coupled to the connector member in a state in which the connector member is coupled to the clamp.

In this case, however, in order to allow the U-hook shaped wiper arm to be coupled to the connector member, a space in which the wiper arm is capable of freely moving forward or backward is required. In a case where the space is not secured, it is difficult to achieve coupling of the wiper arm and the connector member.

DISCLOSURE

Technical Problems

The present invention has been made in an effort to solve the problems of the prior art, and it is an object of the present invention to provide a wiper blade assembly configured to facilitate connection of a wiper arm and a connector member.

Technical Solution

In accordance with an aspect of the present invention, the above and other objects can be accomplished by providing a wiper blade assembly including a wiper connector part positioned at a predetermined lengthwise region, wherein the wiper connector part includes a connector member to which a wiper arm is coupled and a connector receiving part in which the connector member is received, and the connector receiving part includes a first hinge shaft shaped of a protrusion having a predetermined thickness on a first widthwise inner sidewall and a second hinge shaft shaped of a protrusion having a predetermined thickness on a second widthwise inner sidewall.

The connector receiving part may further include a lengthwise inner sidewall, a space having a predetermined size may be formed by the widthwise inner sidewall and the lengthwise inner sidewall, and the connector member may be received in the space.

The connector member includes a wiper arm receiving part having a space of a predetermined size, the wiper arm receiving part includes widthwise inner sidewall and lengthwise inner sidewalls, the space of a predetermined size is formed by the second widthwise inner sidewalls and the lengthwise inner sidewalls, and the wiper arm is received in the space.

The connector member further includes a hinge shaft fastening part to be coupled to a first hinge shaft or a second hinge shaft of the connector receiving part.

The hinge shaft fastening part includes a hinge shaft inserting part for inserting the first hinge shaft or the second hinge shaft into the hinge shaft fastening part and a hinge shaft seating part to which the first hinge shaft or the second hinge shaft is coupled to be seated.

The cross-sectional shape of the first hinge shaft or the second hinge shaft includes a hinge main shaft and a hinge sub shift extending from the hinge main shaft, the hinge main shaft is a hinge shaft for coupling the connector member and the connector receiving part, and the hinge sub shift is a subsidiary shaft serving as a stopper in separating the connector member from the connector receiving part.

The hinge shaft inserting part includes an inserting part first end and an inserting part second end, the hinge shaft inserting part is formed by a space between the inserting part first end and the inserting part second end, and when the connector member is separated from the connector receiving part, the inserting part first end is fixed by the hinge sub shift and the inserting part second end is spaced apart from the inserting part first end.

The thickness of the first hinge shaft is a thickness ranging from a first inner sidewall in a widthwise direction of the connector receiving part to a portion contacting a U-shaped portion of a leading edge of the wiper arm, and a thickness of the second hinge shaft is a thickness ranging from a second inner sidewall in the widthwise direction of the connector receiving part to the portion contacting the U-shaped portion of the leading edge of the wiper arm.

Advantageous Effects

As described above, according to the present invention, the wiper arm and the connector member are first coupled to each other and the connector member is then received in the connector receiving part. Therefore, a need for a space required for forward or backward movement may be eliminated in coupling the U-hook shaped wiper arm to the connector member.

In addition, since the hinge shaft includes a hinge main shaft and a hinge sub shift serving as a stopper, separation of the connector member from the connector receiving part can be facilitated.

MODE FOR INVENTION

Hereinafter, preferred embodiments of the present invention will now be described in detail with reference to the accompanying drawings, such that those skilled in the art can easily practice the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein.

Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Figure 2:
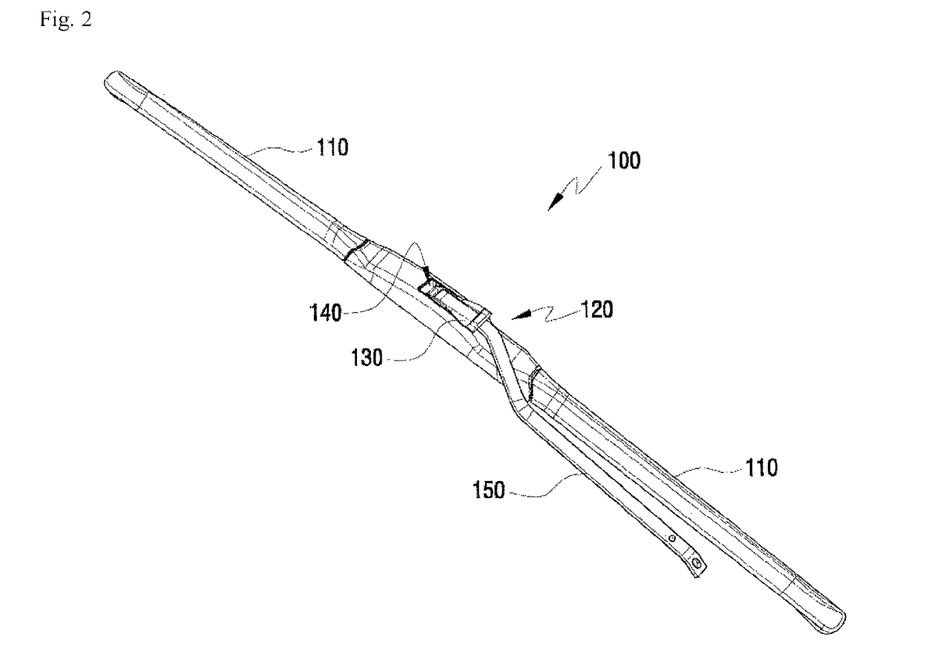
FIG. 2 is a perspective view of a wiper blade assembly according to an embodiment of the present invention, specifically a flat type wiper blade assembly.

FIG. 2 is a perspective view of a wiper blade assembly according to an embodiment of the present invention, specifically a flat type wiper blade assembly.

Here, as described above, the wiper blade assembly may be largely classified into a conventional type and a flat type according to the structure of a blade. The conventional type wiper blade assembly is configured to apply an elastic force to pressing a vehicular wind shield against a rubber strip making contact with the wind shield by coupling a plurality of yokes curved in an arc shape with an up-down structure and is widely used in the conventional wiper blade assembly of a vehicle. Meanwhile, the flat type wiper blade assembly includes a single elastic member or a pair of elastic members, instead of yokes. However, the present invention is not limited to the flat type wiper blade.

Referring to FIG. 2, the wiper blade assembly 100 according to the present invention includes a rubber wiper strip (not shown) making contact with the wind shield of the vehicle and a pair of spoilers 110. In addition, a wiper connector part 120 is positioned at a predetermined lengthwise region of the wiper blade assembly 100.

In FIG. 2, the wiper connector part 120 positioned at a lengthwise central region of the wiper blade assembly 100 is illustrated. However, when necessary, the wiper connector part 120 may be positioned at a central region or a peripheral region. Therefore, the present invention does not limit the position of the wiper connector part 120 to those illustrated herein.

Referring further to FIG. 2, in the wiper blade assembly 100 according to the present invention, the wiper connector part 120 includes a connector member 130 to which a wiper arm 150 is coupled and a connector receiving part 140 in which the connector member 130 is received.

Here, the wiper arm 150 is connected to a driving shaft connected to a wiper driving motor of a vehicle side and the wiper blade assembly 100 may be driven by driving the wiper arm 150.

As shown in FIG. 2, the connector receiving part 140 may be integrally formed with the wiper connector part 120. Alternatively, the connector receiving part 140 may be fabricated separately from the wiper connector part 120 to then be fixed.

A configuration of the wiper blade assembly according to the present invention will now be described in detail.

Figure 3:
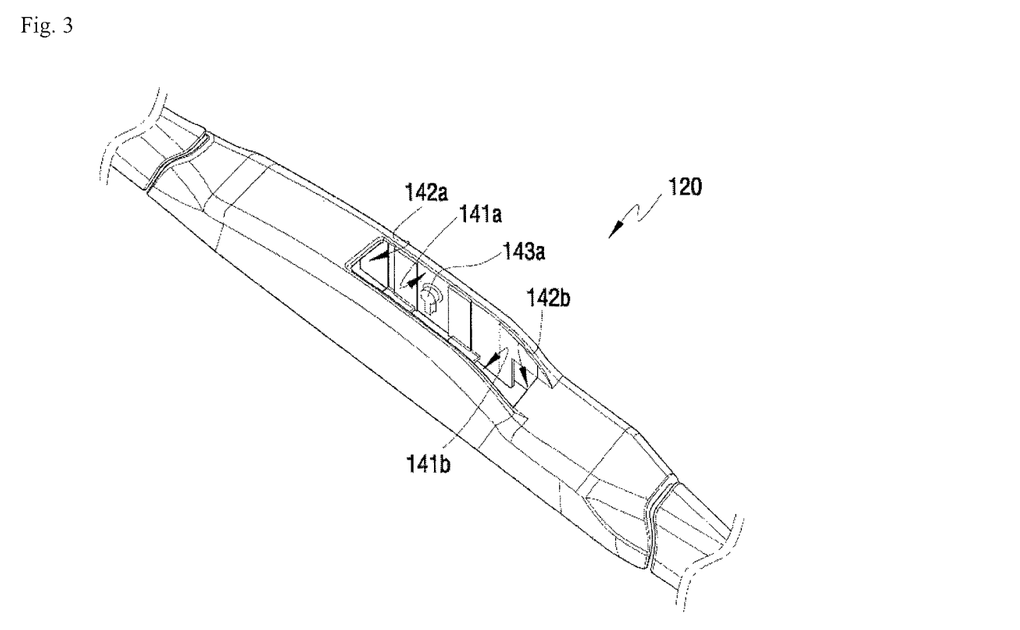
FIG. 3 is a perspective view illustrating a wiper connector part of a wiper blade assembly according to the present invention.
Figure 4:
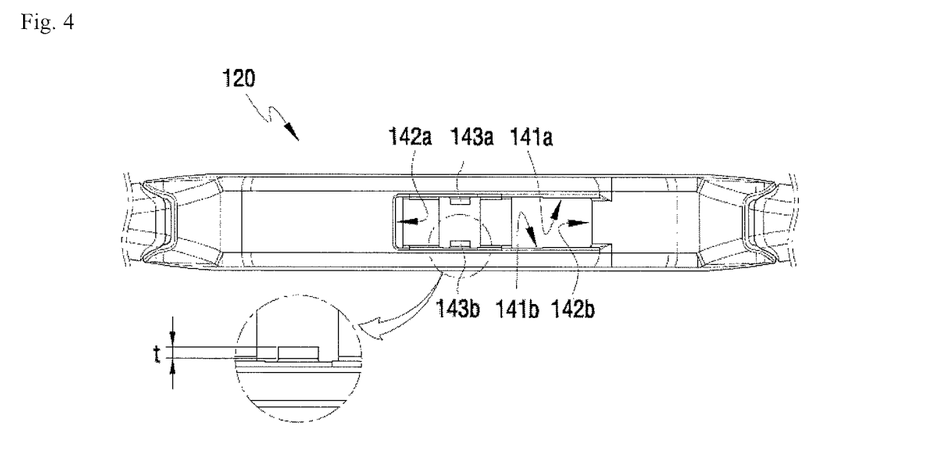
FIG. 4 is a plan view illustrating a wiper connector part of a wiper blade assembly according to the present invention.

FIG. 3 is a perspective view illustrating a wiper connector part of a wiper blade assembly according to the present invention, and FIG. 4 is a plan view illustrating a wiper connector part of a wiper blade assembly according to the present invention.

Referring to FIGS. 3 and 4, as described above, the wiper connector part 120 includes the connector receiving part 140 having a space of a predetermined size, the connector member 130 to which the wiper arm 150 is coupled is received in the space of the connector receiving part 140.

Referring to FIG. 4, the connector receiving part 140 includes inner sidewalls 141a and 141b of a widthwise direction (X) and inner sidewalls 142a and 142b of a lengthwise direction (Y), which forms the space of a predetermined size.

Here, hinge shafts 143a and 143b are formed in predetermined regions of the widthwise (X direction) inner sidewalls 141a and 141b. In the present invention, the hinge shafts 143a and 143b may be protrusions having a predetermined thickness (t).

In more detail, in the connector receiving part 140 according to the present invention, the first hinge shaft 143a shaped of a protrusion having a predetermined thickness (t) is formed on the first widthwise inner sidewall 141a, and the second hinge shaft 143b shaped of a protrusion having a predetermined thickness (t) is formed on the second widthwise inner sidewall 141b.

The shape of the hinge shaft, that is, the protrusion having a predetermined thickness (t), will later be described and the thickness of the hinge shaft, that is, the predetermined thickness (t), will later be described.

Figure 5:
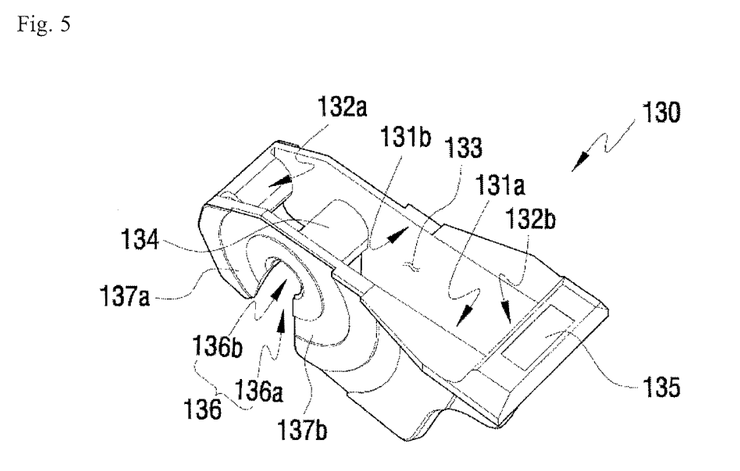
FIG. 5 is a perspective view illustrating a connector member of a wiper blade assembly according to the present invention.
Figure 6:
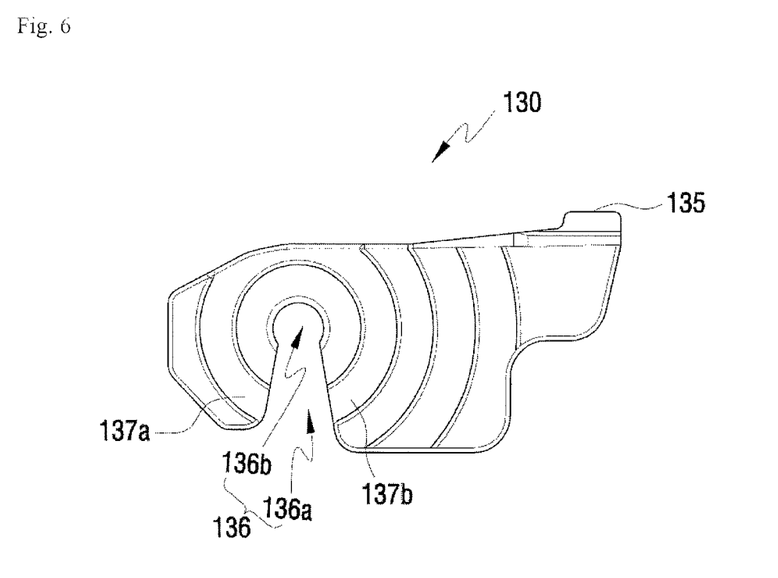
FIG. 6 is a front view illustrating a connector member of a wiper blade assembly according to the present invention.

FIG. 5 is a perspective view illustrating a connector member of a wiper blade assembly according to the present invention and FIG. 6 is a front view illustrating a connector member of a wiper blade assembly according to the present invention.

Referring to FIGS. 5 and 6, as described above, the connector member 130 is received in the space of the predetermined size of the connector receiving part 140. In the present invention, after the wiper arm is coupled to the connector member 130, the connector member 130 is received in the connector receiving part 140.

Here, the wiper arm is connected to a driving shaft connected to a wiper driving motor of a vehicle side and the wiper blade assembly 100 may be driven by driving the wiper arm.

The connector member 130 includes a wiper arm receiving part 133 having the space of a predetermined size. Referring to FIG. 5, the wiper arm receiving part 133 includes inner sidewalls 131a and 131b of a widthwise direction (X) and inner sidewalls 132a and 132b of a lengthwise direction (Y), which forms the space of a predetermined size.

Here, the wiper arm receiving part 133 includes a fixed shaft 134 connecting predetermined regions of the widthwise inner sidewalls 131a and 131b. The fixed shaft 134 corresponds to a wiper arm fitting part for fitting a U-shaped part of a leading edge of a wiper arm (not shown) to be described later.

That is to say, the fixed shaft 134 connects the first widthwise inner sidewall 131a and the second widthwise inner sidewall 131b to each other, and the U-shaped part of the leading edge of the wiper arm may be fitted to the fixed shaft 134 to then be fixed. Meanwhile, the connector member 130 may further include a wiper arm supporting part 135 for preventing the wiper arm from deviating to an upward direction (Z of FIG. 5) of the connector member.

Referring further to FIGS. 5 and 6, the connector member 130 includes a hinge shaft fastening part 136 to be coupled to a hinge shaft positioned at a predetermined region of the widthwise second inner sidewall of the connector receiving part. The hinge shaft fastening part 136 may include a hinge shaft inserting part 136a for inserting the hinge shaft into the hinge shaft fastening part and a hinge shaft seating part 136b to which the hinge shaft is coupled to be seated.

As shown in FIGS. 5 and 6, the hinge shaft inserting part 136a may include an inserting part first end 137a and an inserting part second end 137b and may be formed by a space between the inserting part first end 137a and the inserting part second end 137b.

Figure 7:
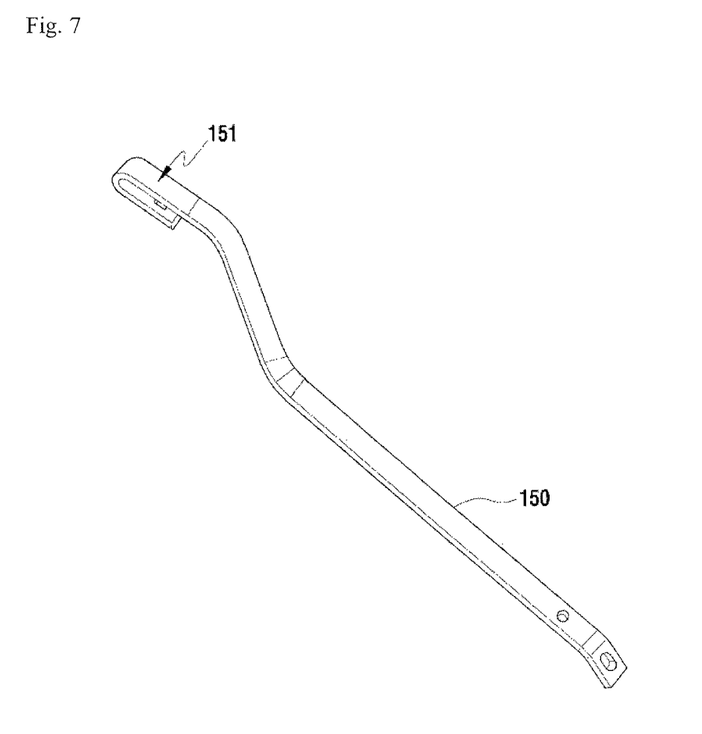
FIG. 7 is a perspective view illustrating a wiper arm of a wiper blade assembly according to the present invention.
Figure 8:
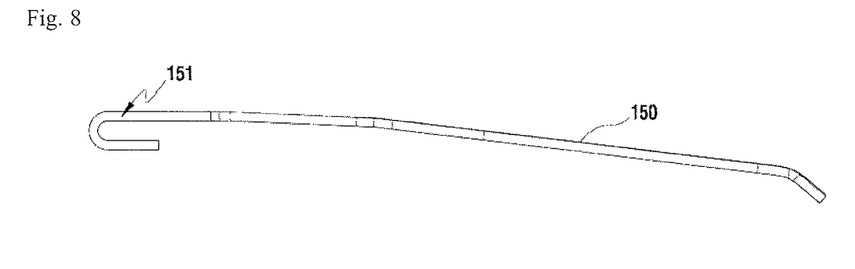
FIG. 8 is a front view illustrating a wiper arm of a wiper blade assembly according to the present invention.

FIG. 7 is a perspective view illustrating a wiper arm of a wiper blade assembly according to the present invention and FIG. 8 is a front view illustrating a wiper arm of a wiper blade assembly according to the present invention.

Here, the wiper arm may be provided as a component of the wiper blade assembly, as described above. However, since the wiper arm is coupled to a driving shaft coupled to a wiper driving motor of a vehicle side, it may not be provided as the component of the wiper blade assembly. In the present invention, for the sake of convenient explanation, the wiper arm may be provided as the component of the wiper blade assembly.

Referring to FIGS. 7 and 8, the wiper blade assembly according to the present invention is a general wiper arm 150, which may include a U-hook shaped part 151 at its leading edge. As described above, the U-shaped part of the leading edge of the wiper arm may be fitted to the fixed shaft 134 positioned on the inner sidewall of the wiper arm receiving part to then be fixed.

Since the wiper arm is obviously known in the related art, a detailed description thereof will not be given.

Figure 9:
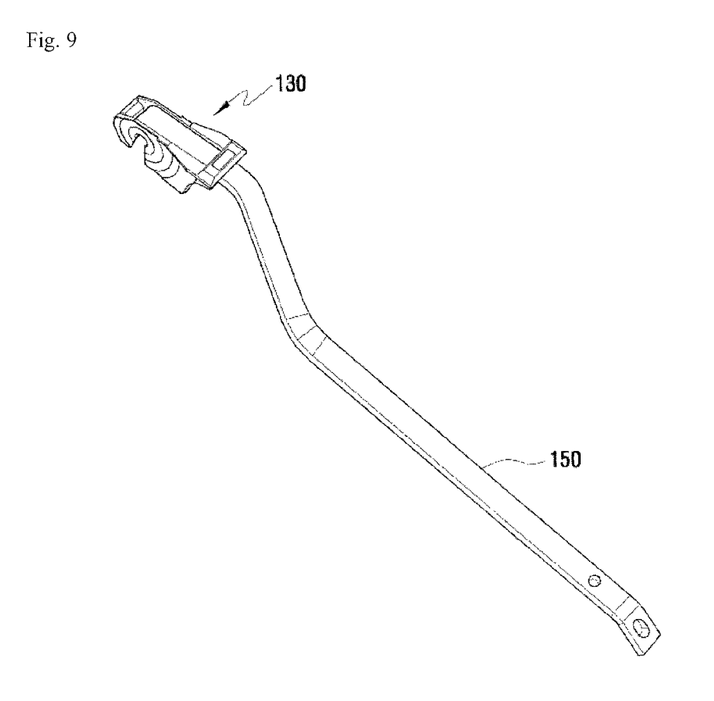
FIG. 9 is a perspective view illustrating a state in which a wiper arm and a connector member are coupled to each other in a wiper blade assembly according to the present invention.
Figure 10:
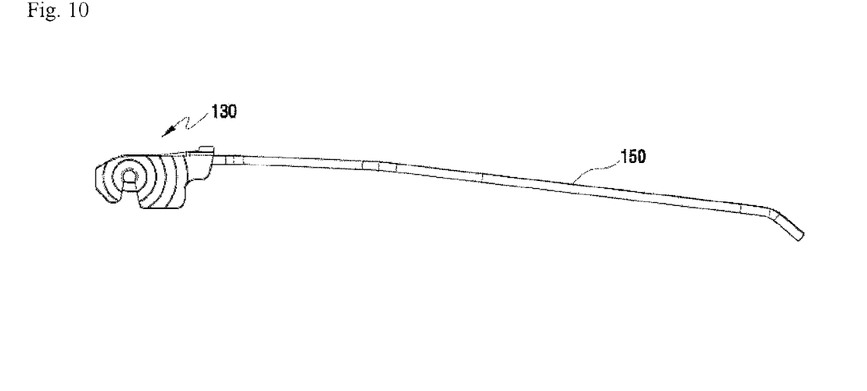
FIG. 10 is a front view illustrating the state in which a wiper arm and a connector member are coupled to each other in a wiper blade assembly according to the present invention.

FIG. 9 is a perspective view illustrating a state in which a wiper arm and a connector member are coupled to each other in a wiper blade assembly according to the present invention and FIG. 10 is a front view illustrating the state in which a wiper arm and a connector member are coupled to each other in a wiper blade assembly according to the present invention.

As described above, the conventional wiper blade assembly is configured such that a clamp is provided in the wiper blade assembly, the connector member is coupled to the clamp, and the wiper arm is coupled to the connector member in a state in which the connector member is coupled to the clamp.

Therefore, in this case, in order to allow the U-hook shaped wiper arm to be coupled to the connector member, a space in which the wiper arm is capable of freely moving forward or backward is required. In a case where the space is not secured, it is difficult to achieve coupling of the wiper arm and the connector member.

In the present invention, however, as shown in FIGS. 9 and 10, the wiper arm and the connector member are first coupled to each other, and the connector member coupled to the wiper arm is then received in the space of the connector receiving part, as will later be described.

That is to say, in the present invention, since the wiper arm and the connector member are first coupled to each other, and the connector member is then seated in the connector receiving part, the U-hook shaped wiper arm does not require a space in which it moves forward and backward to be coupled to the connector member.

The coupling of the wiper arm and the connector member of the wiper blade assembly according to the present invention will now be described in more detail. The connector member 130 includes the wiper arm receiving part 133 having the space of a predetermined size. Referring to FIG. 5, the wiper arm receiving part 133 includes the inner sidewalls 131a and 131b of the widthwise direction (X) and the inner sidewalls 132a and 132b of the lengthwise direction (Y), which forms the space of a predetermined size, which is the same as described above.

Here, the wiper arm receiving part 133 includes a fixed shaft 134 connecting predetermined regions of the widthwise inner sidewalls 131a and 131b. The fixed shaft 134 connects the first widthwise inner sidewall 131a and the second widthwise inner sidewall 131b to each other and a U-shaped part of a leading edge of the wiper arm may be fitted to the fixed shaft 134 to then be fixed.

Meanwhile, the connector member 130 may further include a wiper arm supporting part 135 to prevent the wiper arm from deviating to an upper direction (Z of FIG. 5) of the connector member.

Figure 11:
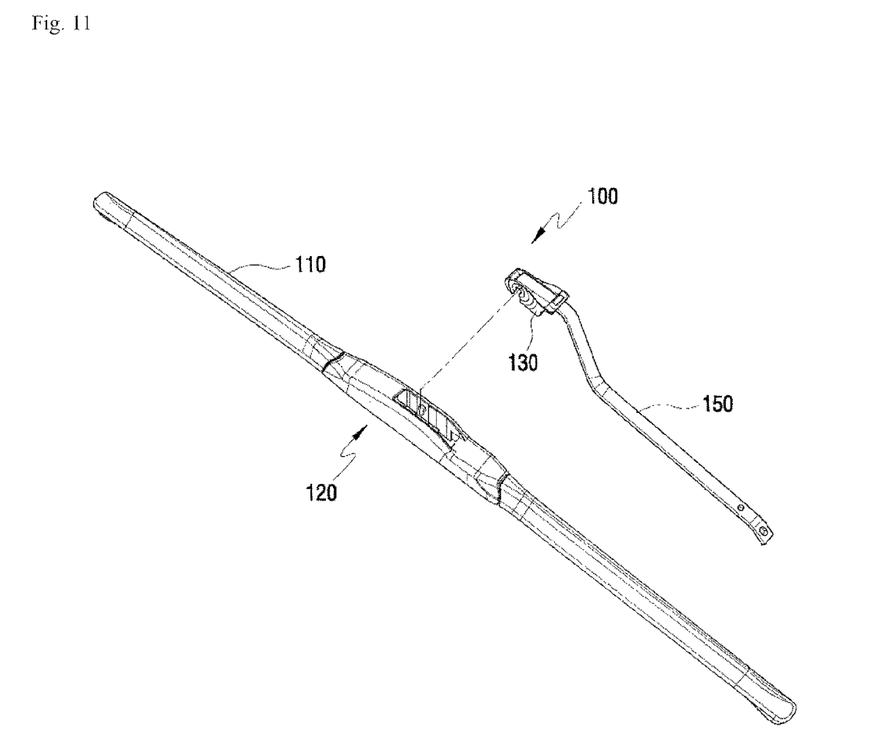
FIG. 11 is a perspective view illustrating a state in which a connector member and a connector receiving part are coupled to each other in a wiper blade assembly according to the present invention.

FIG. 11 is a perspective view illustrating a state in which a connector member and a connector receiving part are coupled to each other in a wiper blade assembly according to the present invention.

As described above, according to the present invention, the wiper arm and the connector member are first coupled to each other and the connector member is then received in the space of the connector receiving part.

Here, when the connector member is received in the space of the connector receiving part, as a hinge shaft fastening part of the connector member and a hinge shaft of the connector receiving part are coupled to each other, the connector member and the connector receiving part are coupled to each other.

In more detail, as described above, the connector member 130 according to the present invention includes a hinge shaft fastening part 136. The hinge shaft fastening part 136 includes a hinge shaft inserting part 136a for inserting the hinge shaft into the hinge shaft fastening part and a hinge shaft seating part 136b to which the hinge shaft is coupled to be seated. Therefore, after the hinge shaft fastening part of the connector member is inserted into the hinge shaft inserting part, it is seated in the hinge shaft seating part in an interference fit manner, thereby coupling the connector member and the connector receiving part to each other.

As described above, the hinge shaft is shaped of a protrusion having a predetermined thickness (t).

That is to say, the general connector member includes a hinge shaft to be coupled to the connector receiving part. In this case, however, the hinge shaft is shaped of a continuous cylinder connecting inner walls, rather than a protrusion having a predetermined thickness. Since the general wiper blade assembly is configured such that the connector member is first coupled to the clamp and the wiper arm is then coupled to the connector member in a state in which the connector member is coupled to the clamp, that is to say, since the connector member is first coupled to the clamp, the coupling of the connector member is not affected by the wiper arm. Therefore, the hinge shaft may have a continuously cylindrical shape.

However, in the present invention, the wiper arm and the connector member are first coupled to each other, and the connector member coupled to the wiper arm is then received in the space of a predetermined size of the connector receiving part, that is to say, the connector member and the wiper arm are first coupled to each other and then coupled to the connector receiving part, the coupling of the connector member is affected by the wiper arm.

Eventually, in the present invention, in a case where the hinge shaft has a shape of a continuous cylinder connecting inner sidewalls, the connector member and the connector receiving part are not coupled to each other by being closed by the U-shaped part of the leading edge of the wiper arm.

Therefore, in the present invention, in order to allow the U-shaped part of the leading edge of the wiper arm to pass the hinge shaft, the hinge shaft is configured to have a non-continuous protrusion having a predetermined thickness, rather than the continuous cylinder.

As described above, the thickness of the hinge shaft should be enough to prevent the hinge shaft from being closed by the U-shaped part of the leading edge of the wiper arm to allow the U-shaped part of the leading edge of the wiper arm to pass the hinge shaft. For example, the thickness of the hinge shaft may be a thickness ranging from the first widthwise inner sidewall or the second widthwise inner sidewall of the connector receiving part to the U-shaped part of the leading edge of the wiper arm.

Figure 12:
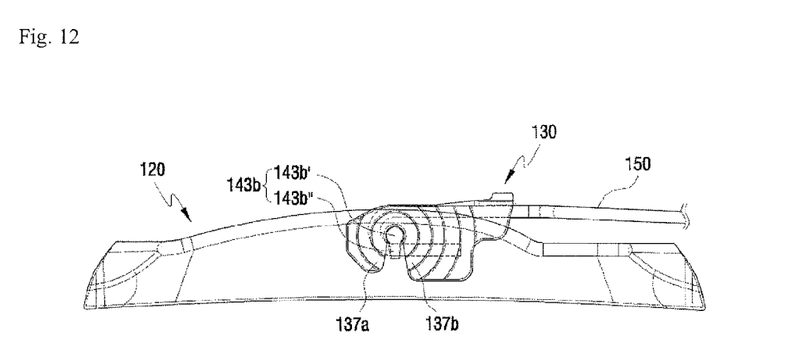
FIG. 12 illustrates coupling of connector member and a connector receiving part in a wiper blade assembly according to the present invention.
Figure 13:
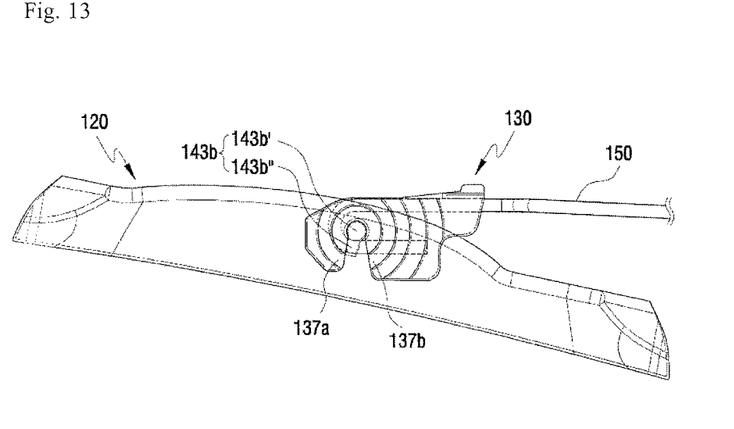
FIG. 13 illustrates separation of connector member and a connector receiving part in a wiper blade assembly according to the present invention.

FIG. 12 illustrates coupling of connector member and a connector receiving part in a wiper blade assembly according to the present invention and FIG. 13 illustrates separation of connector member and a connector receiving part in a wiper blade assembly according to the present invention.

First, as shown in FIG. 12, the connector member and the connector receiving part are coupled to each other such that the hinge shaft of the connector receiving part is inserted into the hinge shaft inserting part and then seated in the hinge shaft seating part in an interference fit manner, thereby coupling the connector member and the connector receiving part to each other.

Here, as shown in FIG. 12, a cross-sectional shape of the hinge shaft 143b according to the present invention includes a hinge main shaft 143b' and a hinge sub shift 143b" extending from the hinge main shaft 143b'. The hinge main shaft 143b' is a hinge shaft for coupling the connector member and the connector receiving part, and the hinge sub shift 143b" is a subsidiary shaft serving as a stopper in separating the connector member from the connector receiving part, as will later be described.

Next, referring to FIG. 13D, the connector member and the connector receiving part can be easily separated by increasing a space between the inserting part first end 137a and the inserting part second end 137b.

That is to say, the increasing of the space between the inserting part first end 137a and the inserting part second end 137b may include increasing an insertion space of the hinge shaft inserting part 136a. Therefore, the hinge shaft coupled in the interference fit manner can be easily separated by the hinge shaft inserting part having the increased inversion space.

In more detail, as described above, the hinge main shaft is a hinge shaft for coupling the connector member and the connector receiving part, and the hinge sub shift 143" is a subsidiary shaft serving as a stopper in separating the connector member from the connector receiving art. As shown in FIG. 13, when a wiper blade is rotated, the hinge sub shift 143" and the inserting part first end 137a are brought into contact with each other. Thereafter, if the wiper blade is rotated with a stronger force, the inserting part first end 137a is fixed by the hinge sub shift 143". However, the inserting part second end 137b that is not fixed by the hinge sub shift 143" is gradually spaced apart from the inserting part first end 137a.

That is to say, when the wiper blade is rotated, the hinge sub shift 143" fixes the inserting part first end 137a, but the inserting part second end 137b is not fixed. Thus, when the wiper blade is rotated by continuously applying a force, the inserting part second end 137b is gradually spaced apart from the inserting part first end 137a, which means that the insertion space of the hinge shaft inserting part 136a is increased. Therefore, the hinge shaft coupled in the interference fit manner can be easily separated by the hinge shaft inserting part having the increased insertion space.

As described above, in the present invention, the wiper arm and the connector member are first coupled to each other, and the connector member coupled to the wiper arm is then received in the space of the connector receiving part, an unnecessary space in which the U-hook shaped wiper moves forward and backward to be coupled to the connector of member may be eliminated.

In addition, the hinge shaft includes a hinge main shaft and a hinge sub shift serving as a stopper, separation of the connector member from the connector receiving part can be facilitated.

Although the foregoing embodiments have been described to practice the road sign reflector and the manufacturing method thereof according to the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

What is claimed is:

1. A wiper blade assembly comprising a wiper connector part positioned at a predetermined lengthwise region,
    wherein the wiper connector part includes a connector member to which a wiper arm is coupled and a connector receiving part in which the connector member is received, and the connector receiving part includes a first hinge shaft shaped of a protrusion having a predetermined thickness on a first widthwise inner sidewall and a second hinge shaft shaped of a protrusion having a predetermined thickness on a second widthwise inner sidewall,
    wherein the connector member further includes a hinge shaft fastening part to be coupled to the first hinge shaft or second shaft of the connector receiving part,
    wherein the hinge shaft fastening part includes a hinge shaft inserting part for inserting the first hinge shaft or the second hinge shaft into the hinge shaft fastening part and a hinge shaft seating part to which the first hinge shaft or the second hinge shaft is coupled to be seated, and
    wherein a cross-sectional shape of the first hinge shaft or the second hinge shaft includes a hinge main shaft and a hinge sub shift extending from the hinge main shaft, the hinge main shaft is a hinge shaft for coupling the connector member and the connector receiving part, and the hinge sub shift is a subsidiary shaft serving as a stopper in separating the connector member from the connector receiving part.

2. The wiper blade assembly of claim 1, wherein the connector receiving part further includes a lengthwise inner sidewall, a space having a predetermined size is formed by the widthwise inner sidewall and the lengthwise inner sidewall, and the connector member is received in the space.

3. The wiper blade assembly of claim 1, wherein the connector member includes a wiper arm receiving part having a space of a predetermined size, the wiper arm receiving part includes widthwise inner sidewalls and lengthwise inner sidewalls, the space of a predetermined size is formed by the widthwise inner sidewalls and the lengthwise inner sidewalls, and the wiper arm is received in the space.

4. The wiper blade assembly of claim 1, wherein the hinge shaft inserting part includes an inserting part first end and an inserting part second end, the hinge shaft inserting part is formed by a space between the inserting part first end and the inserting part second end, and when the connector member is separated from the connector receiving part, the inserting part first end is fixed by the hinge sub shift and the inserting part second end is spaced apart from the inserting part first end.

5. The wiper blade assembly of claim 1, wherein a thickness of the first hinge shaft is a thickness ranging from a first inner sidewall in a widthwise direction of the connector receiving part to a portion contacting a U-shaped portion of a leading edge of the wiper aim, and a thickness of the second hinge shaft is a thickness ranging from a second inner sidewall in the widthwise direction of the connector receiving part to the portion contacting the U-shaped portion of the leading edge of the wiper arm.

\* \* \* \* \*